(12) United States Patent
Vido et al.

(10) Patent No.: US 7,264,725 B2
(45) Date of Patent: Sep. 4, 2007

(54) HOLLOW FIBER MEMBRANE CONTACTOR AND METHOD OF MAKING SAME

(75) Inventors: Tony R. Vido, Belmont, NC (US); William K. Jackson, Fort Mill, SC (US)

(73) Assignee: Celgard Inc., Charlotte, NC (US)

( * ) Notice: Subject to any disclaimer, the term of this patent is extended or adjusted under 35 U.S.C. 154(b) by 477 days.

(21) Appl. No.: 10/793,573

(22) Filed: Mar. 4, 2004

(65) Prior Publication Data

US 2005/0194305 A1    Sep. 8, 2005

(51) Int. Cl.
 *B01D 63/02* (2006.01)
 *B01D 53/22* (2006.01)
 *B01D 61/00* (2006.01)

(52) U.S. Cl. ............ 210/321.88; 210/321.89; 210/321.9; 210/321.78; 210/321.79; 210/650; 210/500.23; 210/493.4; 96/8; 96/10

(58) Field of Classification Search ............ None
See application file for complete search history.

(56) References Cited

U.S. PATENT DOCUMENTS

| | | | |
|---|---|---|---|
| 3,228,877 A | 1/1966 | Mahon | |
| 3,755,034 A | 8/1973 | Mahon et al. | |
| 4,220,535 A | 9/1980 | Leonard | |
| 4,664,681 A | 5/1987 | Anazawa et al. | |
| 4,940,617 A | 7/1990 | Baurmeister | |
| 4,990,251 A * | 2/1991 | Spranger et al. | 210/321.8 |
| 5,186,832 A | 2/1993 | Mancusi et al. | |
| 5,192,490 A * | 3/1993 | Burel | 376/154 |
| 5,192,499 A * | 3/1993 | Sakai et al. | 422/46 |
| 5,264,171 A | 11/1993 | Prasad et al. | |
| 5,284,584 A | 2/1994 | Huang et al. | |
| 5,449,457 A | 9/1995 | Prasad | |
| 5,472,601 A * | 12/1995 | Eguchi | 210/321.8 |
| 6,207,053 B1 | 3/2001 | Carroll et al. | |
| 7,160,455 B2 * | 1/2007 | Taniguchi et al. | 210/321.88 |
| 2003/0009942 A1 | 1/2003 | Amendola et al. | |

FOREIGN PATENT DOCUMENTS

EP    1256372 A2    11/2002
JP    08229359 A *    9/1996

* cited by examiner

*Primary Examiner*—Krishnan S. Menon
(74) *Attorney, Agent, or Firm*—Hammer & Hanf, P.C.

(57) ABSTRACT

The instant invention is a hollow fiber membrane contactor, and method of making same. The hollow fiber membrane contactor includes (1) a shell, said shell having a internal bonding surface, an interlocking geometry ring being provided on said internal bonding surface; (2) a unitized structure; (3) a potting material joining said unitized structure to said shell at said interlocking geometry ring thereby forming an interlocking seal therebetween; and (4) end caps, said end caps being adjoined to lateral ends of said shell. The method of making a hollow fiber membrane contactor includes (1) providing a shell, said shell having a internal bonding surface; (2) providing an interlocking geometry ring on said internal bonding surface; (3) forming a unitized structure; (4) placing the unitized structure into said shell (5) potting said unitized structure to said shell at said interlocking geometry ring thereby forming an interlocking seal therebetween; and (6) adjoining end caps to lateral ends of said shell.

31 Claims, 5 Drawing Sheets

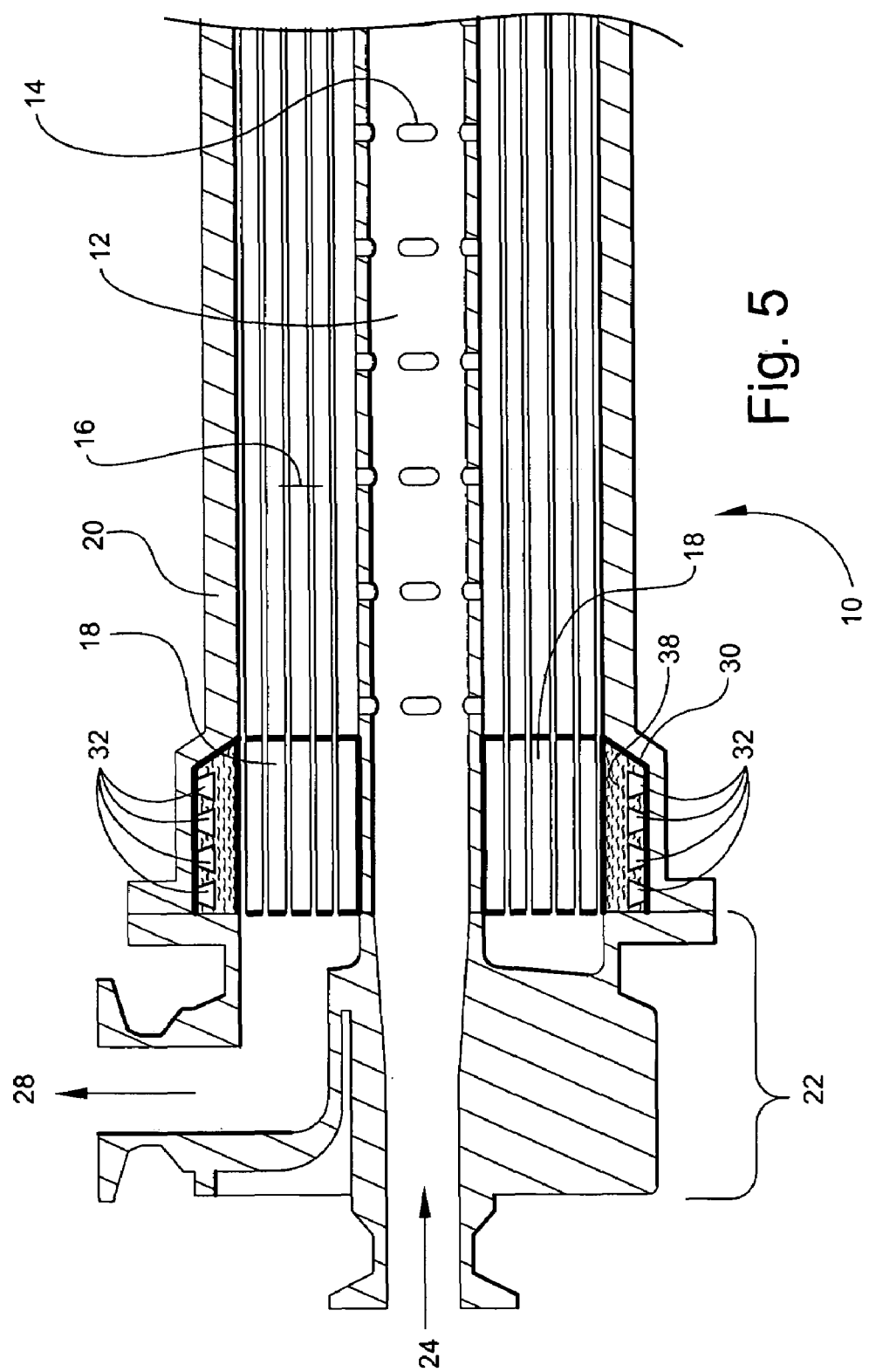

HOLLOW FIBER MEMBRANE CONTACTOR AND METHOD OF MAKING SAME

FIELD OF INVENTION

The instant invention relates to a hollow fiber membrane contactor, and method of making same.

BACKGROUND OF THE INVENTION

A contactor is a mass transfer device that removes-or adds a material to a fluid. Contactors may be used to remove or add gas to a fluid stream. Hollow fiber membrane contactors are known. For example, see U.S. Pat. Nos. 3,288,877; 3,755,034; 4,220,535; 4,664,681; 4,940,617; 5,186,832; 5,264,171; 5,284,584; and 5,449,457. Hollow fiber membrane contactors are commercially available under the name of LIQUI-CEL® from Celgard Inc. of Charlotte, N.C. and under the name of SEPAREL® from Dianippon Ink and Chemicals of Tokyo, Japan. Such contactors have numerous uses, one being the degassing of liquids.

To facilitate manufacture of these contactors, the hollow fiber membranes are typically formed into a fabric (e.g., woven or knitted). The fabric could be wound around a mandrel (e.g., a perforated center tube) and fixed into place by potting the fabric edges, with either thermosetting or thermoplastic materials, to form a unitized structure. See, for example, U.S. Pat. Nos. 4,940,617 and 5,284,584. This unit can then be inserted within a shell and sealed, i.e., with or without O-rings, to make a membrane contactor. See, for example, U.S. Pat. No. 6,207,053. However, because of potting shrinkage and/or expansion, it is difficult to maintain the seal between the unit and the shell in membrane contactors with large diameters.

Most hollow fiber membrane contactors with small diameters are made by integrally potting the unit inside the housing. This eliminates the need to provide or maintain any additional seal therebetween the unit and the housing via other means, i.e. O-rings, or gaskets. As the contactor diameter becomes large, however, it becomes more difficult to maintain the joint between the unit and the housing due to many possible reasons such as shrinkage or expansion of either the cartridge or the unit during or after potting. Thus, instead of integral potting, elastomeric O-rings have been used to create a seal therebetween the unit and the housing, but as contactor diameter becomes large, O-ring seals also become difficult to maintain and/or rectify uniformly.

Accordingly, there is a need for a membrane contactor with a large diameter, where the unit could be secured inside the housing permanently by employing a more robust potting method that lends itself to high mechanical strength and durability; furthermore, there is a need for a method of making the same.

SUMMARY OF THE INVENTION

The instant invention is a hollow fiber membrane contactor, and method of making same. The hollow fiber membrane contactor includes (1) a shell, said shell having an internal bonding surface, an interlocking geometry ring being provided on said internal bonding surface; (2) a unitized structure; (3) a potting material joining said unitized structure to said shell at said interlocking geometry ring thereby forming an interlocking seal therebetween; and (4) end caps, said end caps being adjoined to lateral ends of said shell. The method of making a hollow fiber membrane contactor includes (1) providing a shell, said shell having an internal bonding surface; (2) providing an interlocking geometry ring on said internal bonding surface; (3) forming a unitized structure; (4) placing the unitized structure into said shell (5) potting said unitized structure to said shell at said interlocking geometry ring thereby forming an interlocking seal therebetween; and (6) adjoining end caps to lateral ends of said shell.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 5 is an enlarged longitudinal cross-sectional view of one end of the present invention.

DETAILED DESCRIPTION OF THE INVENTION

Figure 1:
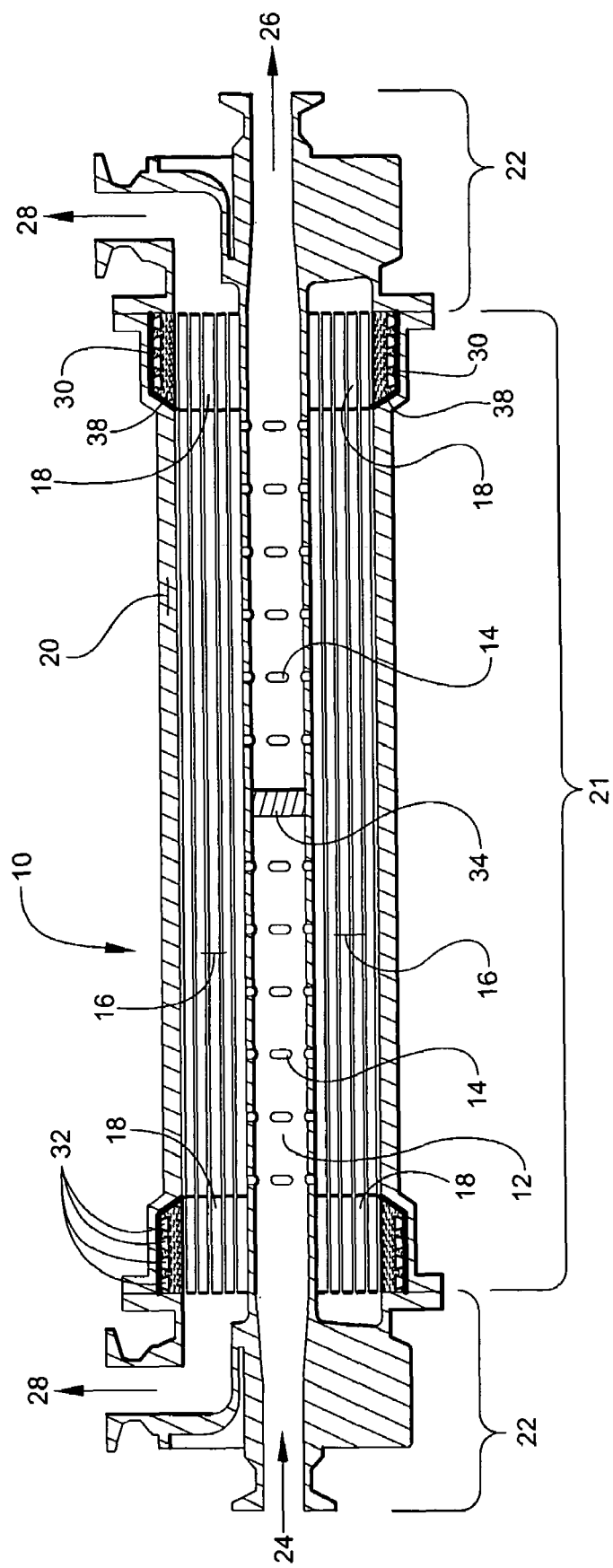
FIG. 1 is a schematic illustration of a hollow fiber membrane contactor.

Referring to the drawings wherein like numerals indicate like elements, there is shown, in FIG. 1, a preferred embodiment of a hollow fiber membrane contactor (10). In FIGS. 1-4, hollow fiber membrane contactor (10) includes cartridge (21) and end caps (22). Cartridge (21) includes shell (20) and unitized structure (19). The center tube (12), hollow fiber fabric (16), and tube sheets (18), formed by a first potting material, define the unitized structure (19). The center tube (12) has a plurality of perforations (14) and a flow-diverting baffle (34). Hollow fiber fabric (16) is wound around center tube (12), and tube sheets (18) are located at each of the lateral ends of hollow fiber fabric (16). Shell (20) surrounds the unitized structure (19), and a second potting material (38) forms an interlocking seal therebetween shell (20) and unitized structure (19).

In preferred operation, a liquid, for example laden with an entrained gas, is introduced to hollow fiber contactor (10) via port (24) in a fluid communication with tube (12). The liquid exits tube (12) via perforations (14), travels over the exterior surface of the hollow fibers of hollow fiber fabric (16), and exits contactor (10) via port (26) after reentering tube (12). Ports (28) are coupled with a vacuum and/or sweep gas source and are in fluid communication with the lumen side of the hollow fibers of the hollow fiber fabric (16). Therefore, when the gas-laden liquid travels over the exterior surface of the hollow fibers, vacuum drawn on the lumen side of the hollow fibers of the hollow fiber fabric (16) provides the driving force for the diffusion of the gas from the liquid to lumen side of the hollow fibers of the hollow fiber fabric (16) where it is exhausted via ports 28.

Figure 2:
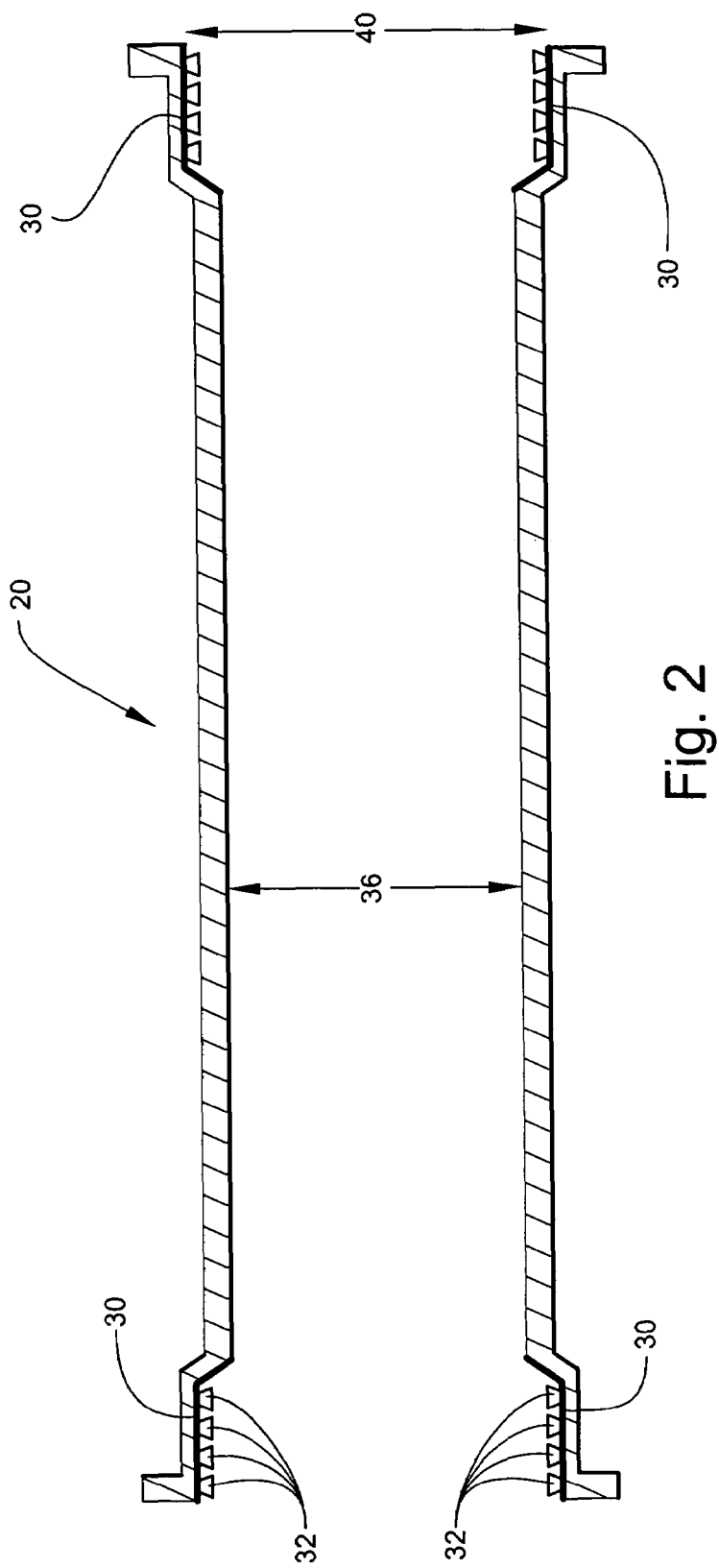
FIG. 2 is a longitudinal cross-sectional view of a shell.

Referring to FIG. 2, shell (20) may have any shape. Such shapes may be selected from the group consisting of a cylindrical shape, a rectangular shape, and combinations thereof. Shell (20) includes an internal bonding surface (30). Internal bonding surface (30), as used herein, is defined as the interior surface of the lateral ends of shell (20). Shell (20) may or may not have flanged ends on either side, as shown in FIGS. 1, 2, and 5.

Shell (20) may have any diameter. Preferably, shell (20) has a diameter (36) greater than 6 inches. More preferably, shell (20) has a diameter (36) of at least 10 inches. The diameter (40) of shell (20) at its lateral ends, which defines the internal bonding surface (30), may be greater or less than the shell diameter (36). Preferably, diameter (40) is constant over the internal bonding surface (30), but it may vary, e.g. outwardly flared, or inwardly reduced.

An interlocking geometry ring (32) is provided on internal bonding surface (30). Ring (32) may have various longitudinal cross-sectional shapes, disclosed below. There must be at least one ring (32); however, multiple rings (32) are also possible. Different methods may be employed to provide ring (32) on internal bonding surface (30). These methods include, but are not limited to, welding or gluing. In the alternative, ring (32) may be an integral component of internal bonding surface (30), i.e. ring (32) may be cut into the internal bonding surface (30). Regardless of which method being employed to provide ring (32) on internal bonding surface (30), the point of attachment of ring (32) to internal bonding surface (30) may have any width. Preferably, the point of attachment of ring (32) to internal bonding surface (30) is at least 0.4 inch (1.0 cm) wide. The width of the point of attachment of ring (32) to internal bonding surface (30) is important in maintaining the seal between shell (20) and the unitized structure (19) because it is the potential shear stress-induced line of failure under shell side pressure loading.

Figure 3:
FIG. 3 is a schematic illustration of different longitudinal cross-sectional shapes of interlocking geometry ring.
Figure 3:
Figure 3:
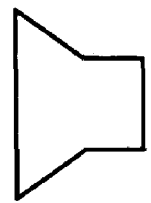
Figure 3:
Figure 3:
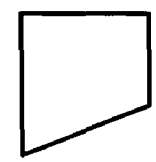
Figure 3:
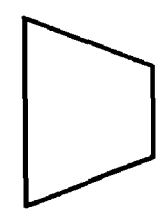
Figure 3:
Figure 3:
Figure 3:
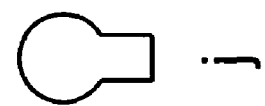
Figure 3:
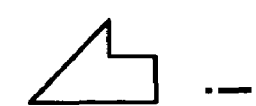
Figure 3:
Figure 3:
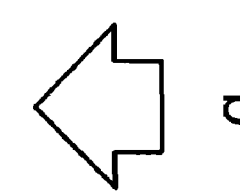

Referring to FIG. 3, interlocking geometry ring (32) may have various longitudinal cross-sectional shapes. These shapes include a dovetail-shaped design (3*a*), a left wedge-shaped design (3*b*), a right wedge-shaped design (3*c*), a dovetail-shaped design with an extension arm (3*d*), a left wedge-shaped design with an extension arm (3*e*), a right wedge-shaped design with an extension arm (3*f*), a spearhead-shaped design (3*g*), a left semi-spearhead-shaped design (3*h*), a right semi-spearhead-shaped design (3*i*), a circular-shaped design (3*j*), a left-semi-circular-shaped design (3*k*), a right-semi-circular-shaped design (3*l*), or combinations thereof.

Figure 4:
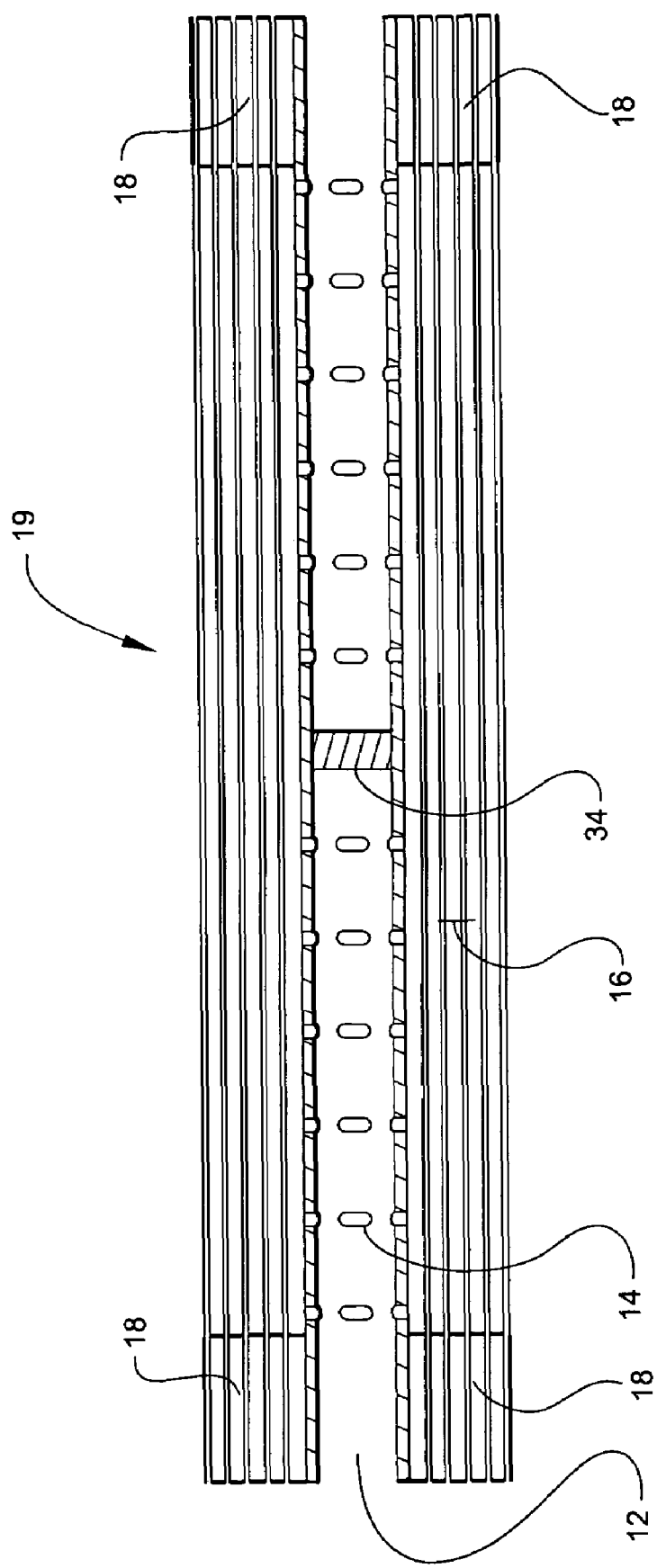
FIG. 4 is a longitudinal cross-sectional view of unitized structure.

Referring to FIG. 4, unitized structure (19) includes center tube (12), hollow fiber fabric (16), and tube sheets (18).

The center tube (12) may be made of any material, which possesses sufficient mechanical strength to provide the desired support for the hollow fiber fabric 16, and tube sheets (18). The center tube (12) may be comprised of a plastic such as polypropylene, polyethylene, polyvinyl chloride, polyvinylidene fluoride, or ABS (Acrylonitrile-butadiene-Styrene), a composite material, or a metal. Preferably, center tube (12) includes plurality of perforations (14), and flow diverting baffle (34).

Hollow fiber fabric (16) may be constructed using processes well known in the art. Generally, in hollow fiber fabric construction, the hollow fiber membranes are formed into a bundle with a suitable shape for hollow fiber fabric construction. Preferred bundle arrangements include parallel laying down of fibers or bias wrap laying down of fibers. The hollow fibers of hollow fiber fabric (16) are any membranes suitable for use in diffusion operations. See Kesting, R. E., Synthetic Polymeric Membranes, $2^{nd}$ ed., John Wiley & Sons, New York, N.Y., (1985), incorporated herein by reference.

The hollow fiber membranes may be made of synthetic polymers, cellulose, or synthetically modified cellulose. Synthetic polymers include, but are not limited to, polyethylene, polypropylene, polybutylene, poly (isobutylene), poly (methyl pentene), polysulfone, polyethersulfone, polyester, polyetherimide, polyacrylnitril, polyamide, polymethylmethacrylate (PMMA), ethylenevinyl alcohol, and fluorinated polyolefins. Preferably, the hollow fiber membranes are made of polyolefin. Examples include, but are not limited to, microporous polyolefin membranes, commercially available under the name of CELGARD® hollow fibers from Celgard Inc. of Charlotte, N.C. or asymmetric membranes from Dainippon Ink and Chemicals of Tokyo, Japan, see U.S. Pat. No. 4,664,681 incorporated herein by reference.

Spacer may be used to maintain the space between the layers of the wound hollow fiber fabric (16), so that fluid may be evenly distributed over the entire surface of all the hollow fibers. This distribution is important to maximize removal efficiency of the contactor. See U.S. Pat. No. 4,940,617.

Tube sheets (18) are located at each end of the hollow fiber fabric (16). Preferably, the tube sheets (18) are cylindrical in longitudinal cross-section with sufficient thickness to provide support for the hollow fiber fabric (16) and to withstand the pressures exerted on the tube sheets (18) during operation. The tube sheets (18) function to hold the hollow fiber fabric (16) in place and to partition the contactor (10) into a shell side passageway and a lumen side passageway.

The tube sheets (18) may be comprised of first potting materials. Preferably, hollow fiber fabric (16) is wound around the center tube (12), and first potting materials are laid at the lateral edges of the hollow fiber (16) to form tube sheets (18).

First potting materials should be capable of forming a fluid tight seal around the hollow fiber membranes. It is preferable that first potting materials be capable of bonding to the center tube (12) and/or shell (20) as well as the hollow fiber fabric (16).

First potting materials may be thermosetting materials or thermoplastic materials. Thermosetting materials include, but are not limited to, epoxy, and polyurethane. Epoxies are preferred. Thermoplastics, as used herein, refers to a high polymer that softens when exposed to heat and returns to its original condition when cooled to room temperature; the term is usually applied to synthetics such as polyvinyl chloride, nylons, fluorocarbon polymers, linear polyethylene, polyurethane prepolymer, polystyrene, polypropylene, and cellulosic and acrylic resins. Exemplary thermoplastics include polyolefins, such as polypropylene and polyethylene.

Different potting methods may be employed to complete the first potting step. Different potting methods, as described hereinafter, include, but are not limited to, bead potting, centrifugal potting, mold potting, and gravity potting.

In bead potting, as described in the U.S. patent application Publication 2003/0009942 A1, which is incorporated herein by reference, simultaneously with winding of the hollow fiber fabric (16) around center tube (12), first potting materials are laid at the lateral edges of hollow fiber fabric (16) to form tube sheets (18).

In centrifugal potting, the hollow fiber fabric (16) is inserted into shell (20), the assembly is then spun on its midpoint to create centrifugal force at both ends of the hollow fiber fabric (16), first potting material are introduced into the shell-side space near both ends of the hollow fiber fabric (16), and the first potting material is allowed to cure.

In gravity potting, the first potting material is introduced into each end of the vertically mounted hollow fiber fabric (16), one at a time, and allowed to settle into the end of the hollow fiber fabric (16) and cure.

In mold potting, the hollow fiber fabric (16) is placed in a mold, and the mold is filled with the first potting material to a desired depth. The hollow fiber fabric (16) is retained in filled mold until first potting material hardens.

Referring to FIGS. 4 and 5, the unitized structure (19) is disposed within shell (20). Shell (20) functions to protect the outside of the unitized structure (19) from damage and to contain or seal the unitized structure (19) from the outside environment. Shell (20) is arranged about the tube sheets in such a fashion that an interlocking seal is formed between the first tube sheet (18) and shell (20), and the second tube sheet (18) and shell (20), such that fluid cannot communicate across or through the interlocking seal. Thus, contactor (10) is partitioned into a shell side passageway and a lumen side passageway.

Preferably, tube sheets (18) are bonded directly to shell (20) with a second potting material (38), which bonds tube sheets (18) to shell (20) at the interlocking geometry ring (32) to form the interlocking seal. The interlocking geometry ring (32) enhances the mechanical strength of the interlocking seal between tube sheets (18) and shell (20) in multiple directions during the expansions and contractions of the potted materials.

Second potting materials (38) may be thermosetting materials or thermoplastic materials. Second potting materials (38) may be the same material as the first potting material, as described hereinabove. It is preferable that second potting materials (38) be capable of bonding to tube sheets (18) and shell (20) at the interlocking geometry ring (32).

Thermosetting materials include, but are not limited to, epoxy, and polyurethane. Epoxies are preferred. Thermoplastics, as used herein, refers to a high polymer that softens when exposed to heat and returns to its original condition when cooled to room temperature; the term is usually applied to synthetics such as polyvinyl chloride, nylons, fluorocarbon polymers, linear polyethylene, polyurethane prepolymer, polystyrene, polypropylene, and cellulosic and acrylic resins. Exemplary thermoplastics include polyolefins, such as polypropylene and polyethylene.

Different potting methods may be employed to complete the second potting step. Different potting methods, as described hereinabove, include, but are not limited to, mold potting, centrifugal potting, and gravity potting.

In mold potting, as described in the U.S. patent application Publication 2003/0009942 A1, which is incorporated herein by reference, the unitized structure (19) is inserted into shell (20), and that structure is inserted into a mold. Second potting materials (38) are injected through the mold, into the space between shell (20) and tube sheet (18). The potting materials (38) are allowed to solidify, and form the interlocking seal therebetween the tube sheets (18) and shell (20).

The cartridge (21) is, then, removed from the mold. The ends are, preferably, subjected to a rotary cut to open the end of the hollow fibers and to generate a planar cut surface that is perpendicular to the centerline of the cartridge (21).

The cartridge (21) may be heat-treated. Heat-treatment increases the thermal/mechanical integrity of the cartridge (21) by reducing residual stress. Heat-treating is, preferably, for a period of time sufficient for the cartridge to come to thermal equilibrium.

End caps (22) are adjoined to cartridge (21) to form contactor (10). End caps 22 are preferably made of thermoplastic or composite materials. The adjoining of the end caps (22) to the cartridge (21) can be achieved by means selected from the group consisting of butt-welding techniques, lap-welding techniques, solvent welding techniques, thermal welding techniques, bolted flange joints, and joints induced by infrared or ultrasonic methods.

As will be readily apparent to those of ordinary skill, placement of ports may vary, so long as the integrity of the shell side passageway and the lumen side passageway is maintained.

Port (24) is a feed inlet means, it is generally a port, nozzle, fitting or other opening which allows introduction of mixture fluids, which is to be separated, into a hollow fiber membrane contactor.

Port (26) is a non-permeate outlet means, which is adapted for removing the fluids, which do not permeate through the hollow fiber membranes. Port (26) is generally a port, nozzle, fitting, or other opening, which allows the removal of the non-permeate from the hollow fiber membrane contactor.

Ports (28) are permeate outlet means for removing fluid, which permeate through the hollow fiber membrane. Ports (28) are generally a port, nozzle, fitting, or other opening adapted for withdrawing the permeate.

The present invention may be embodied in other forms without departing from the spirit and the essential attributes thereof, and, accordingly, reference should be made to the appended claims, rather than to the foregoing specification, as indicated the scope of the invention.

The invention claimed is:

1. A method of making a hollow fiber membrane contactor comprising the steps of:
   providing a shell, said shell having a internal bonding surface,
   providing a plurality of interlocking geometry rings on said internal bonding surface;
   winding a hollow fiber fabric around a center tube, first potting the fabric and the tube together thereby forming a tube sheet, forming thereby a unitized structure;
   placing said unitized structure into said shell;
   second potting said structure to said shell at said interlocking geometry ring forming thereby an interlocking seal therebetween;
   adjoining end caps to lateral ends of said shell; and thereby
   forming a hollow fiber membrane contactor.

2. The method of making a hollow fiber membrane contactor according to claim 1, wherein said interlocking geometry ring having a longitudinal cross-sectional shape selected from the group consisting of dovetail-shaped design, a left wedge-shaped design, a right wedge-shaped design, a dovetail-shaped design with an extension arm, a left wedge-shaped design with an extension arm, a right wedge-shaped design with an extension arm, a spearhead-shaped design, a left semi-spearhead-shaped design, a right semi-spearhead-shaped design, a circular-shaped design, a left-semi-circular-shaped design, a right-semi-circular-shaped design, or combinations thereof.

3. The method of making a hollow fiber membrane contactor according to claim 1, wherein said internal bonding surface being an interior lateral end of said shell.

4. The method of making a hollow fiber membrane contactor according to claim 3, wherein said interlocking geometry ring being affixed to said internal bonding surface via welding or gluing.

5. The method of making a hollow fiber membrane contactor according to claim 4, wherein said interlocking geometry ring having a point of attachment adapted for bonding to said internal bonding surface, said point of attachment having a width greater than 0.4 inch (1.0 cm).

6. The method of making a hollow fiber membrane contactor according to claim 3, wherein said interlocking geometry ring being cut into said internal bonding surface as an integral component thereof.

7. The hollow fiber membrane contactor according to claim 6, wherein said interlocking geometry ring having a point of attachment to said internal bonding surface, said point of attachment having a width greater than 0.4 inch (1.0 cm).

8. The method of making a hollow fiber membrane contactor according to claim 3, wherein said shell having a diameter greater than 6.0 inches (15.2 cm).

9. The method of making a hollow fiber membrane contactor according to claim 8, wherein said diameter being enlarged at said lateral ends gradually, instantly, or combinations thereof.

10. The method of making a hollow fiber membrane contactor according to claim 8, wherein said diameter being reduced at said lateral ends gradually, instantly, or combinations thereof.

11. The method of making a hollow fiber membrane contactor according to claim 1, wherein said first potting material and second potting material are the same.

12. The method of making a hollow fiber membrane contactor according to claim 1, wherein said potting materials being selected from the group consisting of thermosetting materials and thermoplastic materials.

13. The method of making a hollow fiber membrane contactor according to claim 12, wherein said thermosetting materials being selected from the group consisting of epoxies and polyurethanes.

14. The method of making a hollow fiber membrane contactor according to claim 12, wherein said thermoplastic materials being selected from the group consisting of polyolefins.

15. The method of making a hollow fiber membrane contactor according to claim 1, wherein said second potting step being a potting method selected form the group consisting of a mold potting method, a centrifugal potting method, and a gravity potting method.

16. The method of making a hollow fiber membrane contactor according to claim 1, wherein said method further comprising the step of heat-treating said hollow fiber membrane contactor.

17. The method of making a hollow fiber membrane contactor according to claim 16, wherein said heat-treating step further comprises a first heat-treating step, and a second heat-treating step.

18. The method of making a hollow fiber membrane contactor according to claim 1, wherein said adjoining step is preformed by means selected from the group consisting of jointing clamps, butt-welding, lap-welding, solvent welding, thermal welding, bolted flange joints, and joints induced by infrared or ultrasonic methods.

19. A hollow fiber membrane contactor comprising:
   a shell, said shell having a diameter, said diameter being enlarged at both said lateral ends gradually, instantly, or combinations thereof;
   said shell having a first internal bonding surface at one of said enlarged lateral ends and a second internal bonding surface at said other enlarged lateral end;
   a plurality of interlocking geometry rings being provided on both said first and second bonding surfaces;
   a unitized structure comprising a center tube, a hollow fiber fabric wound around said tube, and a first potting material joining together said fabric and said tube thereby forming a tube sheet;
   a second potting material joining said structure to said shell at both said interlocking geometry rings; and
   end caps.

20. The membrane contactor of claim 19 where said second potting material further joining said end caps to said lateral ends of said shell whereby said end caps being sealed to said shell without the use of O-rings.

21. The hollow fiber membrane contactor according to claim 19, wherein said interlocking geometry rings having a longitudinal cross-sectional shape selected from the group consisting of a dovetail-shaped design, a left wedge-shaped design, a right wedge-shaped design, a dovetail-shaped design with an extension arm, a left wedge-shaped design with an extension arm, a right wedge-shaped design with an extension arm, a spearhead-shaped design, a left semi-spearhead-shaped design, a right semi-spearhead-shaped design, a circular-shaped design, a left-semi-circular-shaped design, a right-semi-circular-shaped design, or combinations thereof.

22. The hollow fiber membrane contactor according to claim 19, wherein said interlocking geometry rings being affixed to said internal bonding surfaces via welding or gluing.

23. The hollow fiber membrane contactor according to claim 22, wherein said interlocking geometry rings having a point of attachment adapted for bonding to said internal bonding surfaces, said point of attachment having a width greater than 0.4 inch (1.0 cm).

24. The hollow fiber membrane contactor according to claim 22, wherein said interlocking geometry rings being cut into said internal bonding surface as an integral component thereof.

25. The hollow fiber membrane contactor according to claim 19, wherein said diameter being greater than 6.0 inches (15.2 cm).

26. The hollow fiber membrane contactor according to claim 19, wherein said first potting material and second potting material are the same.

27. The hollow fiber membrane contactor according to claim 19, wherein said potting materials being selected from the group consisting of thermosetting materials and thermoplastic materials.

28. The hollow fiber membrane contactor according to claim 27, wherein said thermosetting materials being selected from the group consisting of epoxies and polyurethanes.

29. The hollow fiber membrane contactor according to claim 26, wherein said thermoplastic materials being selected from the group consisting of polyolefins.

30. The hollow fiber membrane contactor according to claim 19, wherein said hollow fiber membrane contactor further comprising a fabric spacer, said spacer adapted for maintaining fibers of said fabric in a uniform and spaced apart fashion.

31. The hollow fiber membrane contactor according to claim 19, wherein said hollow fiber membrane contactor further comprising a baffle.

* * * * *